United States Patent [19]

Weidner et al.

[11] Patent Number: 5,548,053

[45] Date of Patent: * Aug. 20, 1996

[54] PROCESS FOR THE PREPARATION OF ORGANOPOLYSILOXANE RESIN

[75] Inventors: Richard Weidner, Burghausen; Konrad Mautner, Kastl; Reinhardt Mueller, Burghausen, all of Germany

[73] Assignee: Wacker-Chemie GmbH, Munich, Germany

[ * ] Notice: The term of this patent shall not extend beyond the expiration date of Pat. No. 5,401,821.

[21] Appl. No.: 313,192

[22] PCT Filed: May 13, 1992

[86] PCT No.: PCT/EP93/01201

§ 371 Date: Oct. 12, 1994

§ 102(e) Date: Oct. 12, 1994

[87] PCT Pub. No.: WO93/23455

PCT Pub. Date: Nov. 25, 1993

[30] Foreign Application Priority Data

May 13, 1993 [DE] Germany ............... 42 16 139.8

[51] Int. Cl.$^6$ ................................ C08G 77/06
[52] U.S. Cl. ............... 528/14; 528/21; 528/12; 528/39; 528/34; 528/23
[58] Field of Search ............... 528/21, 12, 39, 528/34, 23, 14

[56] References Cited

U.S. PATENT DOCUMENTS

| | | | |
|---|---|---|---|
| 4,242,252 | 12/1980 | Newing | 528/21 |
| 4,387,196 | 6/1983 | Bonnet et al. | 525/477 |
| 4,413,104 | 11/1983 | Deubzer et al. | 525/479 |
| 4,605,446 | 8/1986 | Isozaki | 106/287.12 |
| 4,624,870 | 11/1986 | Anthony | 427/387 |
| 5,359,022 | 10/1994 | Mauther et al. | 528/23 |
| 5,401,821 | 3/1995 | Geck et al. | 528/12 |

*Primary Examiner*—Margaret Glass
*Attorney, Agent, or Firm*—Martin Connaughton

[57] ABSTRACT

The present invention relates to a process for the preparation of organopolysiloxane resins by hydrolysis and condensation of silanes and/or (partial) hydrolysates thereof.

7 Claims, No Drawings

PROCESS FOR THE PREPARATION OF ORGANOPOLYSILOXANE RESIN

The invention relates to a process for the preparation of organopolysiloxane resin by hydrolysis and condensation of silanes and/or (partial) hydrolysates thereof, and to the use thereof.

Processes for the preparation of organopolysiloxane resin are already known. For example, EP 195 936 A (Toray Silicone Co., Ltd.; published on 1st Oct. 1986) describes a process for the preparation of so-called MQ resins by hydrolysis of alkyl silicate with a monofunctional silane, the reaction mixture comprising at least 5 percent by weight of hydrogen chloride and the alkyl silicate being slowly added dropwise as the last component. EP 294277 A2 (Shin-Etsu Chemical Co., Ltd.; published on 7th Dec. 1988) furthermore describes the preparation of MQ resins having high M:Q ratio by acid hydrolysis with acids containing sulfur. EP 345 534 A1 (Toray Silicone Co., Ltd.; published on 13th Dec. 1989) describes organopolysiloxanes which contain chloromethyl groups and are prepared by hydrolysis and subsequent condensation, the organopolysiloxane obtained by the hydrolysis being separated off from the other components by phase separation before the condensation. U.S. Pat. No. 4,605,446 (Kansai Paint Co., Ltd.; published on 12th Aug. 1986) describes a process for the preparation of siloxane resins which are free from hydroxyl groups, alkyl silicate and trialkoxysilane being hydrolyzed in the presence of water, a mineral acid and a water-soluble solvent and the product then being subjected to condensation by addition of a base. The German patent application of file reference DE-A-4 132 697 (Wacker-Chemie GmbH; applied for on 1st Oct. 1991) furthermore describes a process for the preparation of organopolysiloxane resin by acid hydrolysis of silanes or partial hydrolysates thereof, after-treatment with a base and subsequent precipitation in water.

The object was to provide a process with which organopolysiloxane resins can be prepared in a simple and easily reproducible manner with high space/time yields.

The invention relates to a process for the preparation of organopolysiloxane resin, which comprises in a 1st stage reacting at least one silane of the formula $$R_3SiOR^1 \qquad (I)$$

and/or a hydrolysate thereof $R_3SiOSiR_3$, in which

R can be identical or different and is a monovalent organic radical and $R^1$ is an alkyl radical, and at least one silane of the formula $$Si(OR^2)_4 \qquad (II)$$

and/or a partial hydrolysate thereof, in which $R^2$ can be identical or different and is an alkyl radical, and if appropriate an organosilicon compound chosen from the group consisting of silanes of the formula $$R^3{}_aSi(OR^4)_{4-a} \qquad (III)$$

and/or partial hydrolysates thereof, in which a is 1 or 2, $R^3$ can be identical or different and is a monovalent organic radical and $R^4$ can be identical or different and is an alkyl radical, and organo(poly)siloxanes of the formula $$(R^5{}_2SiO)_b \qquad (IV)$$

in which $R^5$ can be identical or different and is a monovalent organic radical and b is an integer having a value from 3 to 8, preferably 4 or 5, and mixtures thereof, with water in the presence of acid, the alcohol formed being at least partly distilled off, in a 2nd stage reacting the homogeneous reaction mass obtained in the 1st stage in the presence of a base and at least an amount of water-insoluble organic solvent which is sufficient to obtain a homogeneous reaction mass, and removing the water and alcohol by distillation, in a 3rd stage neutralizing the homogeneous reaction mass obtained in the 2nd stage with an acid, if appropriate distilling off water and alcohol still present and removing the salt formed from the neutralization, which has precipitated out, and if appropriate, in a 4th stage freeing the homogeneous reaction mass obtained in the 3rd stage from the water-insoluble organic solvent.

The radicals R, $R^3$ and $R^5$ in each case independently of one another are preferably monovalent hydrocarbon radicals having 1 to 18 carbon atom(s).

Examples of the radicals R, $R^3$ and $R^5$ are, in each case independently of one another, alkyl radicals, such as the methyl, ethyl, n-propyl, iso-propyl, n-butyl, isobutyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexyl and the 3-norbornenyl radical; cycloalkyl radicals, such as cyclopentyl, cyclohexyl, 4-ethylcyclohexyl and cycloheptyl radicals, norbornyl radicals and methylcyclohexyl radicals; aryl radicals, such as the phenyl, biphenylyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the alpha- and the β-phenylethyl radical.

Examples of substituted hydrocarbon radicals as the radical R, $R^3$ or $R^5$ are, in each case independently of one another, halogenated hydrocarbon radicals, such as the chloromethyl, 3-chloropropyl, 3-bromopropyl, 3,3,3-trifluoropropyl and 5,5,5,4,4,3,3-heptafluoropentyl radical, and the chlorophenyl, dichlorophenyl and trifluorotolyl radical; mercaptoalkyl radicals, such as the 2-mercaptoethyl and 3-mercaptopropyl radical; cyanoalkyl radicals, such as the 2-cyanoethyl and 3-cyanopropyl radical; acyloxyalkyl radicals, such as the 3-acryloyloxypropyl and 3-methacryloyloxypropyl radical; aminoalkyl radicals, such as the 3-aminopropyl, N-(2-aminoethyl)-3-aminopropyl and N-(2-aminoethyl)-3-amino-(2-methyl)propyl radical; aminoaryl radicals, such as the aminophenyl radical; and hydroxyalkyl radicals, such as the hydroxypropyl radical and radicals of the formula

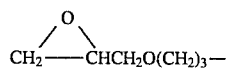

and HOCH$_2$CH(OH)CH$_2$SCH$_2$CH$_2$—.

The radicals R, R$^3$ and R$^5$ in each case independently of one another are particularly preferably the methyl and vinyl radical.

Examples of the radicals R$^1$, R$^2$ and R$^4$ are the examples of alkyl radicals given for the radical R, R$^3$ and R$^5$.

The radicals R$^1$, R$^2$ and R$^4$ in each case independently of one another are preferably alkyl groups having 1 to 4 carbon atom(s).

The radicals R$^1$, R$^2$ and R$^4$ in each case independently of one another are particularly preferably the methyl and ethyl radical.

Silanes of the formulae (I), (II) and if appropriate (III) or (partial) hydrolysates thereof in which R$^1$, R$^2$ and R$^4$ have the same meaning are preferably employed in the process according to the invention.

If partial hydrolysates of silanes of the general formula (II) and (III) are employed in the process according to the invention, in each case those having up to 15 silicon atoms are preferred.

Examples of the silanes of the formula (I) employed in the process according to the invention or hydrolysates thereof, that is to say disiloxanes, are trimethylethoxysilane, vinyldimethylethoxysilane, hexamethyldisiloxane, 1,3-diphenyltetramethyldisiloxane, 1,3-bis(allyl)tetramethyldisiloxane and 1,3-divinyltetramethylsiloxane, where hexamethyldisiloxane and 1,3-divinyltetramethylsiloxane are particularly preferred.

Examples of the silanes of the formula (II) employed in the process according to the invention are tetramethoxysilane, tetraethoxysilane and tetra-n-propoxysilane, where tetraethoxysilane and the partial hydrolysate thereof are particularly preferred.

Examples of the silanes of the formula (III) employed, if appropriate, in the process according to the invention are methyltrimethoxysilane, vinyltrimethoxysilane, 3-mercaptopropyltrimethoxysilane, 3-chloropropyltrimethoxysilane, phenyltrimethoxysilane, o-, m- and p-tolyltrimethoxysilane, propyltrimethoxysilane, methyltriethoxysilane, vinyltriethoxysilane, 3-mercaptopropyltriethoxysilane, 3-chloropropyltriethoxysilane, 3-aminopropyltriethoxysilane, N-(2-aminoethyl)-3-aminopropyltrimethoxysilane, N-(2-aminoethyl)-3-aminopropyldimethoxymethylsilane, N-(2-aminoethyl)-3-amino-(2-methyl)-propyldimethoxymethylsilane, phenyltriethoxysilane, o-, m- and p-tolyltriethoxysilane, propyltrimethoxysilane, dimethyldiethoxysilane and dimethyldimethoxysilane, where methyltrimethoxysilane, methyltriethoxysilane, phenyltriethoxysilane, o-, m- and p-tolyltriethoxysilane and propyltriethoxysilane are preferably employed.

Examples of the organo(poly)siloxanes of the formula (IV) employed, if appropriate, in the process according to the invention are hexamethylcyclotrisiloxane, octamethylcyclotetrasiloxane and decamethylcyclopentasiloxane, where octamethylcyclotetrasiloxane and decamethylcyclopentasiloxane are preferred.

If a silane of the formula (III) or partial hydrolysates thereof and/or organo(poly)siloxane of the formula (IV) are employed, these are employed in amounts of preferably up to 15 percent by weight, based on the total Weight of the silicon compounds.

The use of a silane of the formula (III) or partial hydrolysates thereof and organo(poly)siloxane of the formula (IV) is not preferred in the process according to the invention.

In the 1st stage of the process according to the invention, a mixture of silanes of the formula (I) and/or hydrolysates thereof, in particular that where R is the methyl or vinyl radical, and silane of the formula (II) and/or hydrolysate thereof is preferably employed in a molar ratio, based on Si units, of preferably 0.5:1 to 1.5:1, particularly preferably 0.6:1 to 1:1, where R$^1$ in formula (I) has the same meaning as R$^2$ in formula (II).

In the process according to the invention, in the 1st stage water and acid are added to a mixture of silane of the formula (I) and/or hydrolysate thereof, silane of the formula (II) and/or partial hydrolysate thereof and, if appropriate, organosilicon compound of the formula (III) and/or partial hydrolysate thereof or (IV) and the components are mixed.

In the 1st stage of the process according to the invention, water is employed in amounts of preferably 5 to 30 percent by weight, particularly preferably 5 to 20 percent by weight, in particular 8 to 18 percent by weight, in each case based on the total weight of the reaction mass of the 1st stage before the distillation.

The acids employed in the 1st stage of the process according to the invention can be the same acids which have also previously been used for hydrolysis of silanes having alkoxy groups. Examples of such acids are inorganic acids, such as HCl, HClO$_4$, H$_2$SO$_4$ and H$_3$PO$_4$, organic acids, such as acetic acid, formic acid, propionic acid, p-toluenesulfonic acid, methanesulfonic acid, trifluoromethanesulfonic acid and dodecylbenzenesulfonic acid, where HCl, dodecylbenzenesulfonic acid and p-toluenesulfonic acid are preferably employed and HCl is particularly preferably employed.

To achieve a homogeneous reaction mass, in the 1st stage of the process according to the invention acid is preferably employed in amounts of 0.2 to 50 mmol, particularly preferably 2.5 to 15 mmol, in each case based on 1000 g of the reaction mass of the 1st stage before the distillation. In general, no homogeneity of the reaction mass is achieved at higher acid concentrations. For example, when the particularly preferred HCl is used as the acid, a concentration range from 100 to 500 ppm, based on the total weight of the reaction mass of the 1st stage before the distillation, has proved to be advantageous. If one or more of the radicals R, R$^3$ and R$^5$ is an organic radical containing basic nitrogen, the amount of acid required for neutralization of these radicals must also additionally be added.

The alcohol formed during the hydrolysis in the 1st stage of the process according to the invention is completely or partly removed during or after, in particular after, the hydrolysis. The distillate can contain certain amounts of water, depending on the nature of the alcohol and on the amount of water employed. Preferably, the alcohol is distilled off after the hydrolysis such that the reaction mass remains homogeneous.

Particularly preferably, 50 to 90 percent by weight of alcohol, based on the total weight of alcohol formed, is removed by distillation.

The 1st stage of the process according to the invention is preferably carried out at a temperature of 20° C. up to the boiling temperature of the reaction mass, particularly preferably at the boiling temperature of the reaction mass, and under a pressure of between preferably 900 and 1100 hPa.

The 1st stage of the process according to the invention has preferably been concluded after 30 minutes to 5 hours, particularly preferably 1 to 3 hours.

When the 1st stage of the process according to the invention has ended, the base in at least an amount necessary to achieve a basic reaction mass and, if appropriate, other substances and water-insoluble organic solvent are added.

Depending on the base employed, the amounts of base added are in general in the range from 0.02 to 2.0 percent by weight, based on the total weight of the reaction mass of the 2nd stage before the distillation.

Preferably, the base is added in the 2nd stage in an amount such that the pH is in the range from 8.0 to 14.0, preferably from 9.0 to 12.0.

Bases which can be employed in the 2nd stage of the process according to the invention are all the bases which have also previously been employed as catalysts in condensation reactions.

Examples of such bases are alkali metal hydroxides, such as sodium hydroxide and potassium hydroxide, alkali metal siliconates, such as sodium siliconate and potassium siliconate, amines, such as, for example, methylamine, dimethylamine, ethylamine, diethylamine, triethylamine and n-butylamine, and ammonium compounds, such as, for example, tetramethylammonium hydroxide, tetra-n-butylammonium hydroxide and benzyltrimethylammonium hydroxide, where sodium hydroxide, potassium hydroxide, methylamine, ethylamine, diethylamine and benzyltrimethylammonium hydroxide are preferred and sodium hydroxide, potassium hydroxide and methylamine are particularly preferred.

The term water-insoluble organic solvents is to be understood below as meaning solvents which are miscible with water at most in amounts up to 1 g/l at room temperature and under the pressure of the surrounding atmosphere.

Examples of water-insoluble organic solvents are hydrocarbons, such as pentane, n-hexane, cyclohexane, benzene, toluene and o-, m- and p-xylene, where toluene and o-, m- and p-xylene are particularly preferred.

The water-insoluble organic solvent employed in the 2nd stage of the process according to the invention is used in at least an amount which is sufficient to obtain a homogeneous reaction mass. The amounts here are preferably up to 50 percent by weight, particularly preferably up to 40 percent by weight, of water-insoluble organic solvent, in each case based on the total weight of the reaction mass of the 2nd stage before the distillation. In particular, as many parts by volume of water-insoluble organic solvent as those of alcohol and, if appropriate, water have been distilled off in the 1st stage are added.

In the distillation carried out in the 2nd stage of the process according to the invention, the water contained in the reaction mixture and the remaining alcohol are distilled off completely or virtually completely, water-insoluble organic solvent also being distilled off if appropriate.

The distillation carried out in the 2nd stage of the process according to the invention is advantageously started immediately after the addition of base. The distillation is necessary to achieve an organopolysiloxane resin which is free from alkoxy and/or hydroxyl groups or an organopolysiloxane resin having a low alkoxy and/or hydroxyl content.

On addition of the base in the 2nd stage to the acid reaction mass of the 1st stage, a salt is formed in small amounts and may precipitate out after the distillation in the 2nd stage. In the context of the present invention, however, any salt which has precipitated out is not to be taken into consideration in respect of the term homogeneous reaction mass in the 2nd stage.

The 2nd stage of the process according to the invention is preferably carried out at the boiling temperature of the reaction mass and under a pressure of between 900 and 1100 hPa.

The 2nd stage of the process according to the invention has preferably ended after 0.5 to 5 hours, particularly preferably 1 to 3 hours.

When the 2nd stage of the process according to the invention has ended, the homogeneous reaction mixture is neutralized with acid in a 3rd stage, if appropriate water and alcohol still present are distilled off and the salt which has precipitated out is removed.

All the acids mentioned in stage 1 are suitable as the acid for the neutralization, the same acid as in stage 1 preferably being used.

If acids diluted with water are used for neutralization in the 3rd stage of the process according to the invention and/or the distillation in the 2nd stage was not complete, water must be distilled off in the 3rd stage, the salt present in the reaction mass precipitating out completely after the distillation. Depending on the nature of the water-insoluble organic solvent, especially in the case of toluene and xylene, the water is distilled off as a mixture with this organic solvent.

If anhydrous acids are used for the neutralization in the 3rd stage of the process according to the invention and the distillation in the 2nd stage was complete in respect of water, distillation in the 3rd stage can be omitted, the salt formed during the neutralization precipitating out immediately.

The salt which has precipitated out can then preferably be removed from the reaction mixture by filtration.

When the 3rd stage of the process according to the invention has ended, the organopolysiloxane resin which has been prepared according to the invention and contains water-insoluble organic solvent can be freed from the water-insoluble organic solvent, if appropriate, in a 4th stage. This is preferably effected by spray drying.

The spray drying here is preferably carried out under an inert gas, such as, for example, nitrogen. The intake temperature is preferably between 60° and 350° C. and the discharge temperature is preferably between 50° and 200° C. depending on the water-insoluble organic solvent used. The water-insoluble organic solvent can be recovered again here.

According to a preferred embodiment of the process according to the invention, hexamethyldisiloxane and/or trimethylethoxysilane, if appropriate mixed with 1,3-divinyltetramethyldisiloxane and/or vinyldimethylethoxysilane and tetraethoxysilane and/or a partial hydrolysate thereof in a 1st stage are mixed with water and 0.2 to 50 mmol of acid, based on 1000 g of the reaction mass of the 1st stage before the distillation, the components are reacted at the boiling temperature of the reaction mass and under a pressure of between 900 and 1100 hPa, and the ethanol formed is distilled off, in a 2nd stage the homogeneous reaction mass obtained in the 1st stage is reacted in the presence of a base chosen from the group consisting of sodium hydroxide, potassium hydroxide and methylamine and a water-insoluble organic solvent, in particular toluene or xylene, at the boiling temperature of the reaction mass and under a pressure of between 900 and 1100 hPa, water and ethanol being distilled off completely or virtually completely, in a 3rd stage the homogeneous reaction mass obtained in the 2nd stage is neutralized with an acid, if appropriate water and ethanol are distilled off completely and the salt formed during the neutralization, which has precipitated out, is filtered off, and, if appropriate, in a 4th stage the reaction mass obtained in the 3rd stage is spray-dried under a nitrogen atmosphere.

According to a particularly preferred embodiment of the process according to the invention, hexamethyldisiloxane and/or trimethylethoxysilane, if appropriate mixed with 1,3-divinyltetramethyldisiloxane and/or vinyldimethylethoxysilane and tetraethoxysilane and/or a partial hydrolysate thereof, in a 1st stage are mixed with water and 100 to 500 ppm of HCl, based on the total weight of the reaction mass of the 1st stage before the distillation, the components are reacted at the boiling temperature of the reaction mass and under a pressure of between 900 and 1100 hPa, and about 70 percent by weight of the ethanol formed, based on the total amount of ethanol formed, is distilled off, in a 2nd stage the homogeneous reaction mass obtained in the 1st stage is reacted in the presence of a base chosen from the group consisting of sodium hydroxide, potassium hydroxide and methylamine and toluene or xylene as a water-in-soluble organic solvent at the boiling temperature of the reaction mass and under a pressure of between 900 and 1100 hPa, water and ethanol being distilled off completely or virtually completely, in a 3rd stage the homogeneous reaction mass obtained in the 2nd stage is neutralized with HCl, the water and if appropriate ethanol are distilled off completely and the salt formed during the neutralization, which has precipitated out, is filtered off and, if appropriate, in a 4th stage the reaction mass obtained in the 3rd stage is spray-dried in a nitrogen atmosphere.

If the 4th stage is not carried out in the process according to the invention, the organopolysiloxane resin is as a rule obtained as a mixture with the water-insoluble organic solvent as the so-called resin concentrate.

The organopolysiloxane resin according to the invention has an average molecular weight of preferably 500 to 10000 g/mol, and on average has no alkoxy groups or not more than up to 6 mol percent of alkoxy groups, based on tetrafunctional Si units ($SiO_{4/2}$), and no hydroxyl groups or not more than 0.5 percent by weight of hydroxyl groups, based on the total weight of the organopolysiloxane resin. The organopolysiloxane resin according to the invention is at least partly, but preferably completely, soluble in liquid organopolysiloxane.

Examples of the organopolysiloxane resins according to the invention are $[Me_3SiO_{1/2}]_x[SiO_{4/2}]_y$, where Me is the methyl radical and the ratio of x:y is 0.6:1 to 1:1, and $[Me_3SiO_{1/2}]_x[Me_2ViSiO_{1/2}]_y[SiO_{4/2}]_z$, where Me is the methyl radical, Vi is the vinyl radical, the ratio of (x+y):z is 0.6:1 to 1:1 and the ratio of x:y is 98:2 to 60:40.

The process according to the invention has the advantage that it is very easy to carry out, is very readily reproducible and produces high space/time yields. The water-insoluble organic solvent used and the alcohol can be recovered in a simple manner. Another advantage is that no liquid/liquid phase separation is carried out in the process according to the invention, and no losses in yield thereby occur.

Because of the homogeneous reaction procedure and the low acid concentration, a resin having only a low content of low molecular weight resin fractions is formed.

Organopolysiloxanes which have a high purity, no alkoxy and/or hydroxyl groups or a low content of alkoxy and/or hydroxyl groups and a high storage stability and are excellent for further processing to products having a high storage stability are obtained by the process according to the invention. Powders can therefore be prepared from the resins according to the invention in an excellent manner by spray drying.

The process according to the invention with spray drying carried out in the 4th stage for preparation of organopolysiloxane powder has the advantage that the resin is not changed during the spray drying and the resulting powder is obtained with high solution kinetics. The organopolysiloxane resin powders according to the invention furthermore have the advantage that they are obtained in a form which is essentially free from organic solvent and have a good storage stability.

The organopolysiloxane resin powders according to the invention have an average particle size of preferably 1 to 500 μm. The organopolysiloxane resin powders according to the invention are at least partly, but preferably completely, soluble in organopolysiloxanes and the customary organic solvents. The organopolysiloxane resin powders according to the invention have an excellent solubility in organic solvents, such as toluene, acetone, hexane and tetrahydrofuran, while they are only partly soluble in lower alcohols, such as methanol and ethanol.

The organopolysiloxane resins according to the invention are suitable for all uses for which it has also been possible for organopolysiloxane resins to be employed previously. Thus, the organopolysiloxane resins or concentrates and organopolysiloxane resin powders according to the invention can be used, for example, as foam stabilizers and as an additive to antifoams, toners, paints and other coating systems, such as, for example, paper coating compositions. However, they can also be used instead of hydrophobized highly disperse silicic acid as fillers in plastics, in particular silicone rubber.

In the following examples, all the parts and percentages data relate to the weight, unless stated otherwise. Unless stated otherwise, the following examples are carried out under a pressure of the surrounding atmosphere, that is to say under about 1000 hPa, and at room temperature, that is to say at about 20° C., or at a temperature which is established when the reactants are brought together at room temperature without additional heating or cooling. All the viscosity data given in the examples are based on a temperature of 25° C.

EXAMPLE 1

210 g of water and 1.9 g of 20% strength hydrochloric acid are added to 900 g of tetraethoxysilane having an $SiO_2$ content of 40% (commercially obtainable under the name TES 40 from Wacker-Chemie GmbH, Munich) and 365 g of hexamethyldisiloxane, and the mixture is heated under reflux at a temperature of 78° C. for a period of 2.5 hours. 480 g of distillate are then removed in the course of one hour. The distillate obtained comprises 10% of water and 90% of ethanol. 557 g of toluene and 4 g of a 25% strength solution of NaOH in water are then added to the homogeneous reaction mixture and 457 g of volatile constituents are distilled off. The distillate obtained comprises ethanol to the extent of 47%, water to the extent of 38% and toluene to the extent of 15%. The homogeneous reaction mixture is then neutralized with 2 ml of 20% strength hydrochloric acid, and 121 g of volatile constituents are distilled off. This distillate comprises 3% of ethanol, 0.1% of water and 96.9% of toluene. The sodium chloride which has precipitated out completely is then filtered off.

952 g (98% of theory) of a neutral organopolysiloxane resin solution in toluene with a content of resin of 74.7% by weight and a viscosity of 294 mm²/s are obtained.

The viscosity does not change after the resin solution has been stored at room temperature for two months.

According to NMR measurements, the resin has a residual ethoxy content of 5 mol %, based on tetrafunctional Si units ($SiO_{4/2}$).

If the resin concentrate is diluted with toluene to a resin content of 50%, the resulting solution has a viscosity of 3.8 $mm^2/s$ and an OH content of 0.24%.

The gel permeation chromatogram shows 3 molecular weight fractions with a content of 17.5% of a low molecular weight fraction (elution volume: 15.1 ml), 43.2% of a medium fraction (elution volume: 13.9 ml) and 39.3% of a higher molecular weight fraction (elution volume: 12.7 ml).

A resin powder having an average particle size of 20 μm is produced from the resin concentrate by spray drying in a stream of nitrogen (intake temperature: 160° C. discharge temperature: 130° C.). This resin powder is completely soluble in the customary organic solvents, such as toluene and xylene, and in siloxanes.

A 50% strength solution of the powder in toluene has a viscosity of 3.8 $mm^2/s$ and an OH content of 0.24%. The organopolysiloxane resin according to the invention was thus not changed by the drying process.

EXAMPLE 2

210 g of water and 3.6 g of 50% strength paratoluenesulfonic acid in ethanol are added to 900 g of tetraethoxysilane having an $SiO_2$ content of 40%, 350 g of hexamethyldisiloxane and 55.4 g of 1,3-divinyltetramethyldisiloxane and the mixture is heated under reflux at a temperature of 78° C. for a period of 2.5 hours. 483 g of distillate are then removed in the course of one hour. The distillate obtained comprises 11% of water and 89% of ethanol.

561 g of toluene and 6.4 g of a 40% strength solution of methylamine in water are then added to the homogeneous reaction mixture and 643 g of volatile constituents are distilled off. The distillate obtained comprises 24% of water, 36% of ethanol and 40% of toluene. The homogeneous reaction mixture is then neutralized with a 50% strength solution of paratoluenesulfonic acid in ethanol and the salt which has precipitated out completely is filtered off.

939 g (98% of theory) of a neutral organopolysiloxane resin solution in toluene having a content of resin of 80.0% by weight and a viscosity of 253 $mm^2/s$ are obtained.

According to NMR measurements, the resin has a residual ethoxy content of 4.2 mol %, based on tetrafunctional Si units ($SiO_{4/2}$).

If the resin concentrate is diluted with toluene to a resin content of 50%, the resulting solution has a viscosity of 3.0 $mm^2/s$ and an OH content of 0.20%.

The resin concentrate can be spray dried as described in Example 1 to a resin powder which is completely soluble in toluene and in siloxanes.

EXAMPLE 3

210 g of water and 1.9 g of 20% strength hydrochloric acid in water are added to 900 g of tetraethoxysilane having an $SiO_2$ content of 40%, 350 g of hexamethyldisiloxane and 55.4 g of 1,3-divinyltetramethyldisiloxane and the mixture is heated under reflux at a temperature of 78° C. for a period of 2.5 hours. 483 g of distillate are then removed in the course of one hour. The distillate obtained comprises 11% of water and 89% of ethanol.

561 g of toluene and 4 g of a 25% strength solution of NaOH in water are then added to the homogeneous reaction mixture and 549 g of volatile constituents are distilled off. The distillate obtained comprises 28% of water, 42% of ethanol and 30% of toluene. The homogeneous reaction mixture is then neutralized with 2.1 ml of 20% strength hydrochloric acid in water, 93 g of volatile constituents are distilled off and the salt which has precipitated out completely is filtered off. The resulting distillate comprises 0.02% of water, 0.4% of ethanol and 99.58% of toluene.

945 g (98% of theory) of a neutral organopolysiloxane resin solution in toluene having a solids content of 79.5% and a viscosity of 228 $mm^2/s$ are obtained.

According to NMR measurements, the resin has a residual ethoxy content of 4.0 mol %, based on tetrafunctional Si units ($SiO_{4/2}$).

If the resin concentrate is diluted with toluene to a resin content of 50%, the resulting solution has a viscosity of 3.0 $mm^2/s$ and an OH content of 0.19%.

The gel permeation chromatogram shows 3 molecular weight fractions with a content of 20.1% of a low molecular weight fraction (elution volume: 15.1 ml), 44.8% of a medium fraction (elution volume: 13.9 ml) and 35.1% of a higher molecular weight fraction (elution volume: 12.7 ml).

The resin concentrate can be spray dried as described in Example 1 to a resin powder which is completely soluble in toluene and in siloxanes.

COMPARISON EXAMPLE 1

210 g of water and 1.9 g of 20% strength hydrochloric acid are added to 900 g of tetraethoxysilane having an $SiO_2$ content of 40% and 365 g of hexamethyldisiloxane and the mixture is heated under reflux at a temperature of 78° C. for a period of 2.5 hours. 4 g of a 25% strength solution of NaOH in water are then added to the homogeneous reaction mixture. After about 200 g of volatile constituents have been distilled off, the viscosity of the reaction mixture increases considerably, organopolysiloxane resin precipitates out and the reaction mixture becomes heterogeneous.

COMPARISON EXAMPLE 2

210 g of water and 1.9 g of 20% strength hydrochloric acid are added to 900 g of tetraethoxysilane having an $SiO_2$ content of 40% and 365 g of hexamethyldisiloxane and the mixture is heated under reflux for a period of 2.5 hours. 480 g of distillate are then removed in the course of one hour.

557 g of toluene and 4 g of a 25% strength solution of NaOH in water are then added to the homogeneous reaction mixture and the mixture is heated under reflux for a period of 2 hours. The homogeneous reaction mixture is then neutralized with 2 ml of 20% strength hydrochloric acid, 578 g of volatile constituents are distilled off and the resin solution is freed from the sodium chloride which has precipitated out completely by filtration.

957 g (98% of theory) of a neutral organopolysiloxane resin solution in toluene having a content of resin of 74.3% by weight and a viscosity of 148 $mm^2/s$ are obtained.

If the resin concentrate is diluted with toluene to a resin content of 50%, the resulting solution has a viscosity of 3.67 $mm^2/s$ and an OH content of 0.78%.

The gel permeation chromatogram does not show the three characteristic molecular weight fractions from Example 1.

In each case 150 parts of a polydimethylsiloxane having trimethylsilyl end groups and a viscosity of 75 mm²/s are mixed with 134.6 parts of the resin concentrate from Comparison Example 2 (mixture A) or 133.8 parts of the resin concentrate from Example 1 (mixture B). The mixtures are then freed from the organic solvent at 130° C. and under a pressure of 5 hPa (product A, product B). The viscosity is then determined immediately and after storage.

|  | Viscosity after preparation | Viscosity after 2 days | Viscosity after 18 days |
| --- | --- | --- | --- |
| Product A | 6820 mm²/s | 8789 mm²/s | — |
| Product B | 1358 mm²/s | — | 1357 mm²/s |

The example shows that product A has a significantly higher viscosity and a lower viscosity stability than product B.

COMPARISON EXAMPLE 3

430 g of water and 66 g of 20% strength hydrochloric acid are added to 900 g of tetraethoxysilane having an $SiO_2$ content of 40%, 300 g of hexamethyldisiloxane and 47 g of 1,3-divinyltetramethyldisiloxane and the mixture is heated under reflux for a period of 2.5 hours. 1000 g of toluene and 800 g of water are then added to the heterogeneous reaction mixture and the organic phase is separated off from the aqueous phase. 4 g of a 25% strength solution of NaOH in water are then added to the organic phase and volatile constituents are distilled off to a stirred material temperature of 110° C. for complete removal of water and ethanol. The reaction mixture is then neutralized with 2.1 ml of 20% strength hydrochloric acid and volatile constituents are then distilled off until a resin content of 80% in toluene results. The resin solution obtained is then freed from the sodium chloride which has precipitated out completely by filtration.

The resin solution has a viscosity of 302 mm²/s. According to NMR measurements, the resin has a residual ethoxy content of 4 mol %, based on tetrafunctional Si units ($SiO_{4/2}$).

If the resin concentrate is diluted with toluene to a resin content of 50%, the resulting solution has a viscosity of 3.14 mm²/s and an OH content of 0.25%.

The gel permeation chromatogram shows 3 molecular weight fractions with a content of 36% of a low molecular weight fraction (elution volume: 15.1 ml), 38.8% of a medium fraction (elution volume: 13.9 ml) and 25.2% of a higher molecular weight fraction (elution volume: 12.7 ml).

We claim:

1. A process for the preparation of an organopolysiloxane resin, which comprises
in a 1st stage
reacting at least one silane of the formula $$R_3SiOR^1 \quad (I)$$

and/or a hydrolysate thereof of the formula $R_3SiOSiR_3$, in which
R is identical or different and is a monovalent organic radical and
$R^1$ is an alkyl radical, and at least one silane of the formula $$Si(OR^2)_4 \quad (II)$$

and/or a partial hydrolysate thereof, in which
$R^2$ is identical or different and is an alkyl radical, and optionally an organosilicon compound selected from the group consisting of silanes of the formula $$R^3{}_aSi(OR^4)_{4-a} \quad (III)$$

in which
a is 1 or 2,
$R^3$ is identical or different and is a monovalent organic radical and
$R^4$ is identical or different and is an alkyl radical partial hydrolysates thereof, mixtures of silanes of the formula (III) and partial hydrolysates thereof, and organo (poly) siloxanes of the formula $$(R^5{}_2SiO)_b \quad (IV)$$

in which
$R^5$ is identical or different and is a monovalent organic radical and
b is an integer having a value from 3 to 8,
with water in the presence of a hydrolysis affecting acid, to form a homogeneous reaction mass and distilling off at least part of the alcohol which is formed as a by-product of said reacting;
in a 2nd stage
reacting the homogeneous reaction mass obtained in the 1st stage in the presence of a base condensation catalyst and an amount of water-insoluble organic solvent sufficient to maintain the homogeneity of the reaction mass, and further removing water and alcohol by distillation;
in a 3rd stage
neutralizing the homogeneous reaction mass of the 2nd stage with an acid, thereby forming a salt, distilling off any water and alcohol still present in the reaction mass, and removing precipitated salt; and
optionally, in a 4th stage
freeing the homogeneous reaction mass of the 3rd stage from the water-insoluble organic solvent.

2. The process as claimed in claim 1, wherein, in the 1st stage, the acid is employed in an amount of 0.2 to 50 mmol, based on 1000 g of the reaction mass of the 1st stage before the distillation.

3. The process as claimed in claim 1, wherein, in the 1st stage, the acid is HCl and is employed in an amount of 100 to 500 ppm, based on the total weight of the reaction mass of the 1st stage before the distillation.

4. The process as claimed in claim 1, wherein, in the 2nd stage, a base is selected from the group consisting of sodium hydroxide, potassium hydroxide, methylamine, ethylamine, diethylamine, and benzyltrimethylammonium hydroxide.

5. The process as claimed in claim 1, wherein the water-insoluble organic solvent is toluene or o-, m- or p-xylene.

6. The process as claimed in claim 1, wherein one or both of hexamethyldisiloxane or trimethylethoxysilane, optionally mixed with one or more of 1,3-divinyltetramethyldisiloxane, vinyldimethylethoxysilane, tetraethoxysilane, or a partial hydrolysate thereof
in a first stage
are mixed with water and 0.2 to 50 mmol of acid, based on 1000 g of the reaction mass of the 1st stage before the distillation, the components are reacted at the boiling temperature of the reaction mass and under a pressure of between 900 and 1100 hPa, and the ethanol formed as a by-product of said reacting is distilled off forming a homogeneous reaction mass;

in a 2nd stage
the homogeneous reaction mass of the 1st stage is reacted in the presence of a base selected from the group consisting of sodium hydroxide, potassium hydroxide and methylamine and a water-insoluble organic solvent, at the boiling temperature of the reaction mass and under a pressure of between 900 and 1100 hPa, and water and ethanol are distilled off;

in a 3rd stage
the homogeneous reaction mass of the 2nd stage is neutralized with an acid thereby forming a salt, any remaining water and ethanol are distilled off and precipitated salt is filtered off; and, optionally in a 4th stage
the reaction mass obtained in the 3rd stage is spray-dried under a nitrogen atmosphere.

7. The process as claimed in claim 6, wherein one or both of hexamethyldisiloxane or trimethylethoxysilane, optionally mixed with one or more of 1,3-divinyltetramethyldisiloxane, vinyldimethylethoxysilane, tetraethoxysilane, or a partial hydrolysate thereof, in a 1st stage
are mixed with water and 100 to 500 ppm of HCl, based on the total weight of the reaction mass of the 1st stage before the distillation, the components are reacted at the boiling temperature of the reaction mass and under a pressure of between 900 and 1100 hPa, and about 70% by weight of the ethanol formed as a by-product of said reacting, is distilled off, forming a homogenous reaction mass;

in a 2nd stage
the homogeneous reaction mass of the 1st stage is reacted in the presence of a base selected from the group consisting of sodium hydroxide, potassium hydroxide and methylamine and toluene or xylene as a water-insoluble organic solvent at the boiling temperature of the reaction mass under a pressure of between 900 and 1100 hPa, wherein water and ethanol are further removed by distillation;

in a 3rd stage
the homogeneous reaction mass of the 2nd stage is neutralized with HCl, thereby forming a salt, any remaining water and ethanol are distilled off, and precipitated salt is filtered off; and, optionally, in a 4th stage
the reaction mass obtained in the 3rd stage is spray-dried in a nitrogen atmosphere.

* * * * *

UNITED STATES PATENT AND TRADEMARK OFFICE
CERTIFICATE OF CORRECTION

PATENT NO. : 5,548,053
DATED : August 20, 1996
INVENTOR(S) : Richard Weidner, Konrad Mautner and Reinhardt Mueller It is certified that error appears in the above-indentified patent and that said Letters Patent is hereby corrected as shown below:

Title page, item [57], column 1, following [22] PCT Filed: delete

"May 13, 1992" and insert in lieu of --- May 13, 1993 ---;

after [30] Foreign Application Priority Date; delete

"May 13, 1993" and insert in lieu of --- May 15, 1992 ---.

Signed and Sealed this

Twenty-sixth Day of November 1996

Attest:

BRUCE LEHMAN

*Attesting Officer*  *Commissioner of Patents and Trademarks*